United States Patent [19]

Ruehl

[11] 4,091,762

[45] May 30, 1978

[54] AUDIBLE VIBRATORY REED ASSEMBLY

[75] Inventor: William E. Ruehl, Wheeling, Ill.

[73] Assignee: Illinois Tool Works Inc., Chicago, Ill.

[21] Appl. No.: 724,494

[22] Filed: Sep. 20, 1976

[51] Int. Cl.[2] .......................... G01L 19/12; G08B 3/00

[52] U.S. Cl. .......................................... 116/70; 34/89; 84/363; 116/112; 116/DIG. 25

[58] Field of Search ................. 116/70, DIG. 25, 112, 116/137 R; 84/363, 364, 402; 34/89; 46/180, 181; 55/274

[56] References Cited

U.S. PATENT DOCUMENTS

| | | | |
|---|---|---|---|
| 404,980 | 6/1889 | Pfannenstiel | 84/363 |
| 825,610 | 7/1906 | Olt | 84/364 |
| 2,519,015 | 8/1950 | Bensen | 116/70 X |
| 2,606,400 | 8/1952 | Olt et al. | 46/180 |
| 2,753,831 | 7/1956 | Davies | 116/112 |
| 2,779,305 | 1/1957 | Dunkelman | 116/112 |
| 3,133,523 | 5/1964 | Schleich | 116/137 R |
| 3,587,514 | 6/1971 | Autrand | 116/67 R |
| 3,745,965 | 7/1973 | Ljung et al. | 116/112 |

*Primary Examiner*—Daniel M. Yasich
*Attorney, Agent, or Firm*—Jack R. Halvorsen; Robert W. Beart

[57] ABSTRACT

An audible vibratory biased reed assembly having the properties of being activated or commencing vibration upon being subjected to a predetermined energy level. This assembly utilizes a straight, flat, elongated, closed or clapping reed, to produce a clatter or buzzing sound, with the reed being biased through application of a bias force to one edge to distort its flatness adjacent its free extremity. The bias force is applied by an angular transverse bridge which substantially triples the frequency of the mechanical clatter.

22 Claims, 27 Drawing Figures

AUDIBLE VIBRATORY REED ASSEMBLY

SUMMARY OF THE INVENTION

Vibrating reeds for the production of basic sonic tones have been used for centuries in organs, harmonics, and other sound producing applications. Such devices have been used as warning means wherein differentials in pressure created by a clogged filter exists such as are found in vacuum cleaners, furnaces, refrigeration systems and other systems where the passage of air requires a removal of particulates by means of a filter.

The present invention was primarily designed for use with a household clothes dryer manufactured by a nationally known producer of such devices. While the present device has many other applications, it will be described as used with this particular clothes dryer. These units are unique in that the horizontal, rotating drum is open at both ends. The after end of the drum is supported by an enbossed bulkhead and two rubber tired wheels riding in a spun, recessed track. The position of the wheels are strategically located so as to compensate for the forces imposed by a driving belt. The front end of the drum, having an internal Teflon coated liner bearing, is supported by the front panel of the dryer. Thus, in practicality, the drum is an essentially open-ended cylinder, belt driven on its periphery, supported on one end by two idler rollers, and on the other end by a large diameter plastic bearing.

The air system is a negative pressure system (vacuum) by which a motor driven fan (at the extremity of the system) draws ambient air through a heating duct (gas or electric) into the drum via a grill in the fixed rear bulkhead and then passes through a lint chute via an exit grill in the fixed rear bulkhead. The air then passes through the fan and is discharged through a four-inch internal diameter duct at the lower, rear center of the unit.

The lint chute is a fabricated sheet metal duct connecting the exit grill of the drum area to the fan housing. The chute is fabricated to provide a track which allows the insertion of the lint screen which necessitates the filtering of all air from the drum area before it can exit through the fan and subsequent discharge tube.

The present invention is directed to a biased reed assembly which provides an audible alarm to give a signal when the lint screen is approximately two-thirds full regardless of whether or not the unit is vented to a point remote from the dryer per se. The balance of the background summary is directed to the hydrodynamics which exist in clothes dryer systems.

To have a vent consisting of an elongated, rigid or flexible duct or where the dryer is vented directly into the room where it is situated will affect back pressure and consequently the air velocity and volume of air being passed from the dryer. Two vacuum conditions exist and change in the dryer. Dynamic vaccum due to air flow (Venturi effect) diminishes as the screen in the filter fills and also with an increase of back pressure (the length of the venting system). Static vacuum (due to the inability of the fan to satisfy itself) increases as the lint screen fills, but decreases with an increase of back pressure.

The condition of "vent versus no vent" presents the following problems: With "no vent" (zero back pressure), the dynamic vacuum factor is very high due to the high velocity of unimpeded air flow. Thus, with a clean screen, a manometer reading of 0.50 in./$H_2O$ is read both upstream and downstream of the lint screen, with pulses as high as 0.75 in./$H_2O$ when clothes stick to or are in very close proximity to the exit grill work of the drum. This is one extreme, however, differential vacuum is zero; with extreme vent conditions (162H), velocity and volume are considerably lower. (162H is the symbolism in the trade for the use of two 90° elbows, 16 feet of 4-inch diameter duct, plus a hooded flap vent.) Under these conditions, with the lint screen being clogged to the desired level for audible alarm, average manometer readings are 0.67 in./$H_2O$ downstream of the lint screen and 0.17 in./$H_2O$ upstream of the screen for a differential vacuum of 0.50 in./$H_2O$. This is the other extreme. Thus, it can be seen that the energy levels available to actuate the reed assembly are virtually overlapping, or more simply, the energy to operate the device under "vented" conditions is the same under "zero vented" conditions when the device should not operate.

The following changes occur on an exponential curve:

1. The dynamic vacuum level upstream of the lint screen which is shielded by the accumulating lint decreases due to lack of air flow and resultant decrease in Venturi effect. It must be explained here that although dynamic values decrease, they always remains as a factor due to the porosity of the lint deposition.

2. The dynamic vacuum level downstream of the screen diminishes due to reduced air flow, however, the static value increases due to the reduced availability of air to satisfy the suction fan.

To satisfy this need; it required the discovery of a vibratory reed which would produce an audible sound of sufficient sone value, and which could be mechanically controlled; namely, a closed-reed device, using a large area thin cross-section reed capable of being actuated at this very low energy level, namely, 0.40 in./$H_2O$, or converted to negative pressure — 0.0142 P.S.I. The closed or "clapping" reed was selected to utilize the mechanical "clatter" (or buzzer sound) rather than the true musical tone, which for a reed of this size would be acoustically too low and hence inaudible.

Such a basic device as described above is adaptable for any application of fixed vacuum transition where back pressures and loadings are constant, within a model range, such as H.V.A.C. systems, refrigeration systems, etc., but is inadequate for variable back pressure and loadings such as clothes dryers, vacuum cleaners, etc., where the variable pressures would inadvertently set off the reed clatter due to clothing being temporarily stuck on the grill work or other similar back pressure situations.

The solution to the problem of making a definitive energy level for the commencement of vibration was accomplished in the following manner. First, the reed was made straight and clearance was provided over its mating aperture by mounting the reed at an angle, the preferable angle being of approximately 4°. Secondly, to provide a definitie "take-off" or vibration point, the reed was "biased" by distorting its flatness and its normal state of rest or free position with an angular, transverse bridge at its free extremity. Thus, the reed will not vibrate until sufficient vacuum from below, and resultant pressure from above, which normally is ambient pressure depresses it from its biasing bridge against the mating apertured mounting. The spring of the reed returns it upward to repeat the cycle. The biasing bridge reaped an unforeseen result. The frequency of the mechanical clatter was tripled. As the reed slaps down against its apertured mounting, one impact occurs. As the spring characteristic returns its towards a normal position, the reed strikes the lower end of the angular, transverse bridge providing impact number two. The air flow then drives the reed further upwardly and impacts the reed against the upper end of the angular, transverse bridge. When viewed with a strobe light that is slightly out of synchronization, the reed vibrates in a wave-like motion both transversely and longitudinally. Without the biasing bridge, the reed will vibrate with an infinitesimally small amount of energy, with widely varying amplitudes. However, when the biasing bridge is utilized, a definite minimum energy level is established for vibration and the amplitude is fixed.

While the devices contemplated herein have many other applications, its must be pointed out that the discussion herein is directed to a particular type of dryer in which the manometer readings and physical characteristics set forther herein prevail. The basic device provides a sharp take-off point (vibration) and sufficient audible sound (sone level); however, as described up to this point, it will provide a "beautiful sound" when the lint screen is clogged (162H venting) or a clean screen at zero venting. It can be adjusted for various applications other than the specific one described herein by varying the reed dimensions, angle of biasing, point of biasing and the size of aperture and through such adjustments compensate for these various factors.

Because of the hostile environment in which such devices operate, it is desirable to provide as complete a total enclosure as possible as well as to satisfy the obvious need for a differential control. Thus, it is necessary to have a device that actuates at an energy requirement somewhat below the previous mentioned levels, in the instance 0.40 in./$H_2O$ was selected. By doing this, one facet of back pressure effect is eliminated. Thus, it is necessary to design a control of this type that is responsive to the flow of air through the lint screen, but compensatory for the different and changing velocities of air under extremes of back pressure as evidenced by zero or long venting installations.

At this point, it is necessary to explain the changing conditions within the air flow system of a dryer. While vacuum levels vary with back pressure, the following effects are essentially the same. When the screen is clean, a free air flow through the screen develops a vacuum level on both sides of the screen which is essentially equal. This vacuum being both dynamic and static. As lint begins to clog the screen, which in this embodiment is from the bottom up, the dynamic vacuum upstream of the screen diminishes due to the reduction of air flow through the screen. The air flow must move up and over the clogged portion of the screen. Downstream of the screen, the dynamic vacuum decreases slightly; however, the static vacuum increases rapidly due to the reduced availability of air through the screen.

One solution to this problem is to provide a supply of ambient air at the "nose" of the reed. A large tube is connected opposite of the opening for ambient air and "plugged in" upstream of the filter, on the assumption that the upstream vacuum, where the screen is clean, will steal air from the nose of the reed. This approach is only moderately successful as the exponential characteristics of the dynamic vacuum upstream of the screen make it impossible to steal enough air from the reed to keep it from vibrating under "zero vent" conditions and het have it react under the 162H vented conditions. Also this system was too slow in response to pulses caused by clothes sticking to or coming in close proximity to exit grill in the drum. A further disadvantage was to seriously reduce the efficiency of the entire airflow system of the dryer because of the large amount of ambient air being introduced after the heating element. It should be recognized, however, that such a system could be used with efficacy in other applications for an alarm device.

In basic sonic devices using vibrating reeds, i.e. organs, harmonicas, etc., these instruments make use of systems of valving which require a multitude of hinging, seals, linkages and a host of moving parts which normally would be incompatible with the hostile environment of a clothes dryer. Such systems require the obstruction of access of the input energy.

Since multiple part, trouble prone linkages could not be used in the hostile environment of a clothes dryer, a more direct approach evolved to use mechanical advantage which utilizes the exponential change in vacuum upstream of the screen to brake or dampen the reeds vibration. This is accomplished by attaching a flexible flap to the reed, providing an external suction tube to pneumatically hold the flap in place and thereby restrict the reed from vibrating. The best sensitivity of the assembly for the present embodiment was determined empirically by moving the location of the flap on the reed and varying its size. The best sensitivity is when the flap is located substantially at a general point midway from the transverse bridge and the "bend" point of the reed.

The basis and accuracy of control by such a flap must take into account the following factors: (1) the reed in its preloaded condition, biased, has a given spring force; (2) this spring force must be able to overcome the holding force of the flexible flap when the upstream vacuum of the lint screen diminishes to the point that lint deposition level has been attained for purposes of demanding an audible alarm to the user; (3) because the bias or vibrating point of the reed is below the extremes of actuation, the reed under any conditions wants to vibrate and is drawn down away from the biasing bridge. If the screen is clean, regardless of back pressure, the Venturri effect drawing on the flap functionally locks the reed against vibration; and (4) although the reed is drawn down, under the conditions mentioned in (3), it has not lost contact with the lower end of the biasing bridge, and is still distorted. The initial surge, depending on back pressure, determines how close to being actually closed against its mating aperture in the plate.

Thus, it is an object of the present invention to provide an audible alarm device capable of producing an instantaneous, suitable, audible sound activated by the presence of predetermined pressure conditions.

A further object of the invention is to provide an audible alarm device in the form of a clapping reed in which is biased by application of a force along one edge and captured within and under a transverse angularly disposed bridge to amplify the clatter caused by vibration of the reed.

Still another object of the present invention is to provide further means for controlling the vibrating point of said reed as it is subjected to intermittent extreme conditions which do not truly represent the conditions under which the alarm is to be sounded.

Another object of the invention is to provide a simple, economical alarm for use with home appliances to indicate the presence of clogged filter members which should be cleaned, thereby resulting in savings of energy necessary for operation of the appliance.

Other objects will become apparent to those skilled in the art when the specification is read in conjunction with the attached drawings.

BRIEF DESCRIPTION OF THE DRAWINGS

FIG. 22 is an end view as seen from the right end of the device shown in FIG. 23;

DETAILED DESCRIPTION

Figure 1:
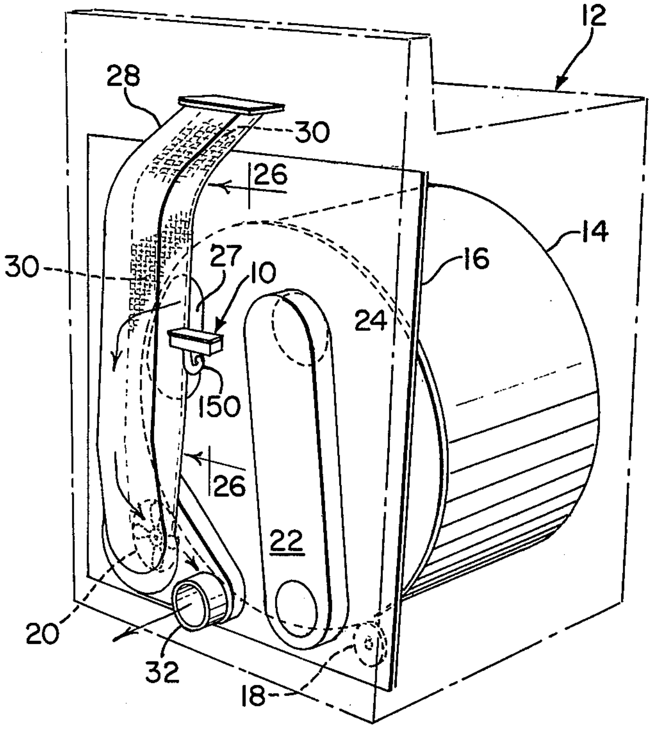
FIG. 1 is a schematic representation of a home clothes dryer to which the present invention has been applied.

Referring now to the drawings wherein similar parts are identified by similar numerals, FIG. 1 is a schematic representation of one form of clothes dryer to which the present invention, generally designated by the numeral 10, could be applied. The dryer 12 includes, in this particular model of dryer, a horizontal rotating drum, open at both ends, with the after end of the drum supported by an embossed bulkhead 16 and two rubber tired wheels 18 riding in a spun, recessed track. The front end of the drum, not shown, has an internal Teflon liner bearing supported by the front panel of the dryer. The air system is a negative pressure or vacuum system by which a motor driven fan 20 draws ambient air through a heating duct 22 into the drum via a grill or opening 24 in the fixed rear bulkhead 16. After circulating around the drum 14 the air is then drawn through an exit grill 26 into the lint chute 28 with an elongated lint filter 30 blocking the passage from grill 26 into the lint chute 28. The heated air is then drawn through the fan 20 and discharged through a duct 32 at the lower rear center of the unit. This duct can discharge into ambient or be conneted to additional duct work for discharge to the exterior of the building in which it is located, as previously described.

Figure 2:
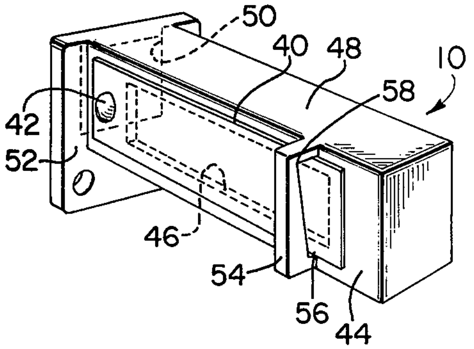
FIG. 2 is a perspective view of a basic concept of this invention, namely, a biased clapper reed as mounted on an apertured reed plate and chamber.

Referring now to FIG. 2, one of the basic concepts of the present invention involves an elongated flat clapper reed 40 mounted by suitable means 42 in angular disposed relation to the plane of a reed plate 44 having an aperture 46 underlying the reed 40. The reed plate 44 forms one wall of a housing 48 having an internal chamber and end port 50 through which a negative pressure can be applied to the chamber of housing 48 to cause activation of the reed 40. Mounting means 52 are provided to secure the assembly to the vacuum or negative pressure source.

At the free end of the reed 40 a bias is applied by means of an angularly disposed transverse bridge 54. The bias is accomplished by contacting and distorting the reed along one edge at a point designated 56. When a negative pressure is applied through the port 50, the reed is drawn downwardly toward the aperture 46 and when it returns by spring pressure, it first strikes the point 56 and thence angularly strikes the "high" point 58 of the angularly disposed transverse bridge 54. Thus, the clatter of the reed 40 is tripled over a normal clapper reed in that it strikes the reed plate 44 and thence on its upward motion away from the reed plate 44 strikes the low point 56 and then the air flow further drives the reed upwardly impacting against the upper end 58 of the angular transverse bridge. Thus, the reed vibrates in a wave-like motion both transversely and longitudinally. Without the biasing bride the reed will vibrate with an infinitesimally small amount of energy with widely varying amplitudes. With the biasing bridge a definite minimum energy level is established vibration and the amplitude is fixed.

The application of this invention can be best seen in relation to the preferred embodiment as shown in FIGS. 3 through 16.

The preferred embodiment of the audible alarm 10 includes a generally rectangularly shaped chamber case 60 which is open along one elongated wall and adapted to be associated with a combination reed plate and cover 62 which divides the case into two chambers and closes the open wall. The chamber case 60 includes groove means 64 centrally disposed along its longitudinal axis to accept the reed plate, thereby forming a lower chamber 66 and an upper chamber 68, as viewed in FIGS. 3 and 4. Lower chamber 66 communicates with a port 70 opening through one end of the chamber case and provided with suitable fastening means 72 for acceptance by angular rotation within a non-circular aperture located in lint chute 28. Fastening means of this type are shown in the U.S. Pat. to Fisher No. 3,443,783, however, it should be recognized that other suitable fastening means such as apertured flanges, screws, adhesives, etc., will be apparent to those skilled in the art.

Upper chamber 68 communicates with two apertures or ports 74 in the back side wall of the case 60 to provide access to the pressure of ambient air. Also formed integrally in the back wall 73 and centrally disposed between the two ambient air ports 74 is a by-pass or vent port 75. The port 75 is formed by a generally cylindrical tubular extension 76 capable of accepting a flexible tube over its exterior surface. The port 75 communicates with a smaller opening or vent 78 with the free extremity 80 being angularly disposed relative to the axis of the vent 78 to form a relatively sharp projection or apex 82 for purposes best set forth hereinafter. Around the free open side of case 60 there is provided a set-off flange 84 forming a seat 86 having a plurality of ridge-like elements 88, in this instance triangular in cross section, extending upwardly from seat 86 for purposes best set forth hereinafter.

Figure 3:
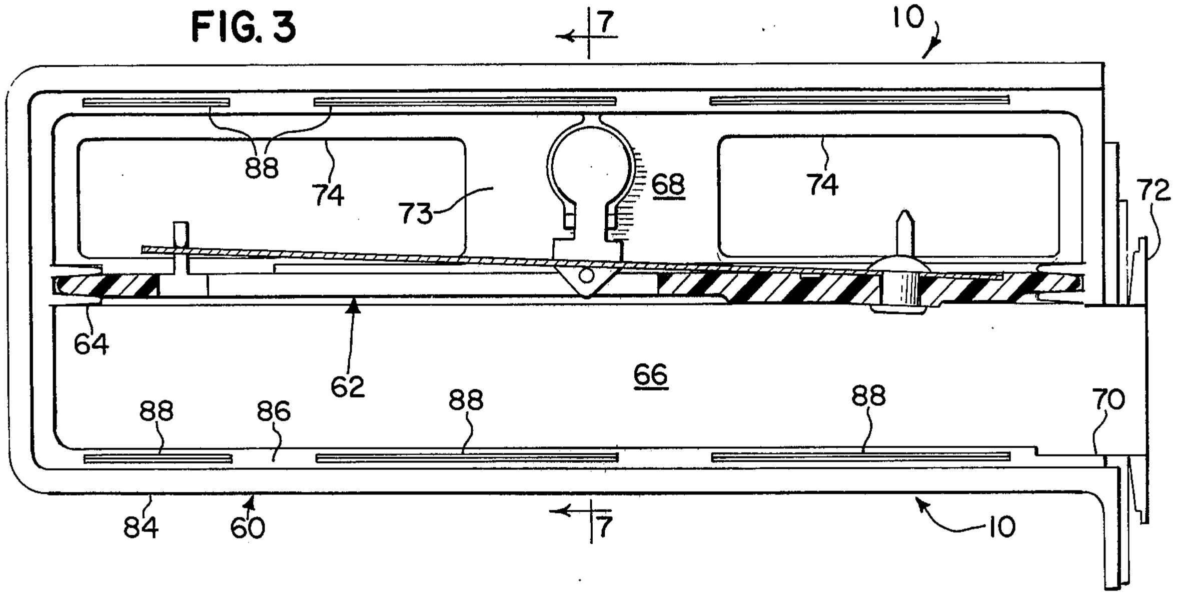
FIG. 3 is a cross-sectional view in partial section of an assembly of the preferred embodiment of the invention.

The reed plate and cover 62 includes two integral portions, namely, the reed plate 90 and the cover 92. In FIG. 3 the cross section is taken through the central portion of the reed plate with the cover removed to permit the view into the chamber case whereas in FIG. 7 it will be apparent that the reed plate is inserted complementarily into the grooves 64 with the cover 92 being brought into position above the seat 86 is contact with the projections 88. The two members, namely case 60 and reed plate cover 62, form two relatively sealed chambers with the cover 92 sealing the open side of the case 60. The actual sealing of the cover 92 relative to case 60 can be accomplished by sonic welding using the projections 88 as an energy concentrating means or the flange 84 can be formed inwardly to overlie the plate 92, as seen in phantom in FIG. 7 and identified by the numeral 94.

Figure 4:
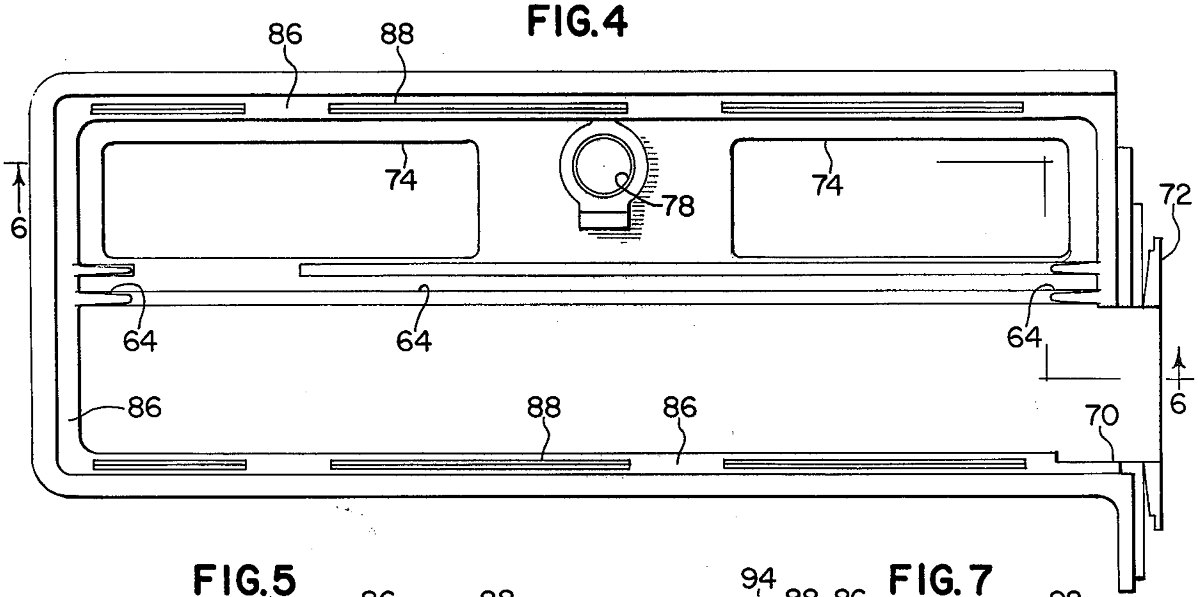
FIG. 4 is an elevational view looking into the interior of the basic chamber case.
Figure 5:
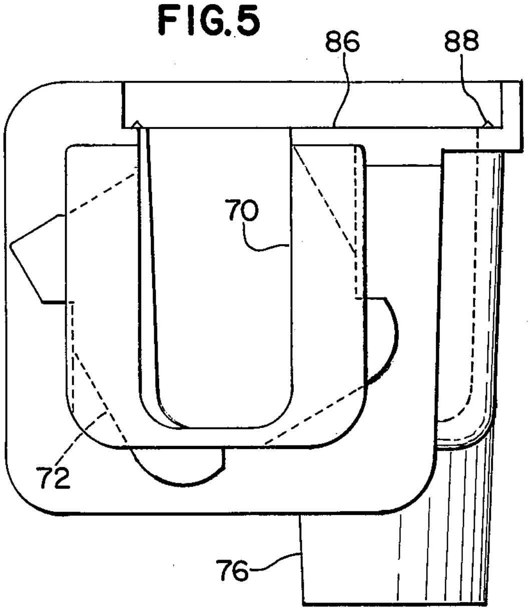
FIG. 5 is an end view of the device shown in FIG. 4 as viewed from the right end of FIG. 4.

Referring now to FIGS. 9 through 13, the cover 92 includes a plurality of transverse strengthening ribs 96 and a laterally extending flange 98 which serves to close and seal the open end of seat 86, port 70 and distortable offset flange 84, as seen in FIG. 4.

The reed plate 90 includes a peripheral rounded edge 98 that is tapered for a short distance to provide easy access when assembled with grooves 64 in the chamber case. This essentially provides a wedge-shape cooperation with the grooves 64 to insure a seal between the chamber 66 and 68 except for aperture 100 that extends longitudinally in the reed plate 90. The reed plate 90 includes an increased thickness portion 102, at the left end of FIGS. 9 and 10, and in the upper surface thereof is provided with an angularly disposed recess 104. On opposite edges of the recess 104 are orienting means in the form of a pair of reference posts 106 with the forward edges thereof, on the side facing aperture 100, falling on a plane passing through the center of the centrally disposed aperture 108 which is adapted to accept a fastening means such as a rivet 110.

At the opposite end of the reed plate and overlying aperture 100 is the biasing bridge 112, which in this embodiment is integral with plate 90. Bridge 112 includes an angularly disposed undersurface 114 having a low point 116 and a high point 118. The aperture 100 is opened into a T-shape by the lateral extensions 120 which permit the integral two-plate molding of the undersurface 114, it being recognized, of course, that the reed must be wider than the width of aperture 100 in order for it to be operative and hence the bridge must be wide enough to accept the reed.

Figure 15:
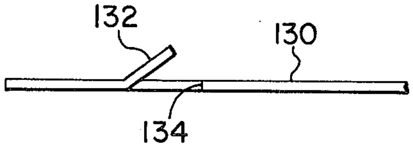
FIG. 15 is a partial side edge view of the reed shown in FIG. 14.
Figure 14:
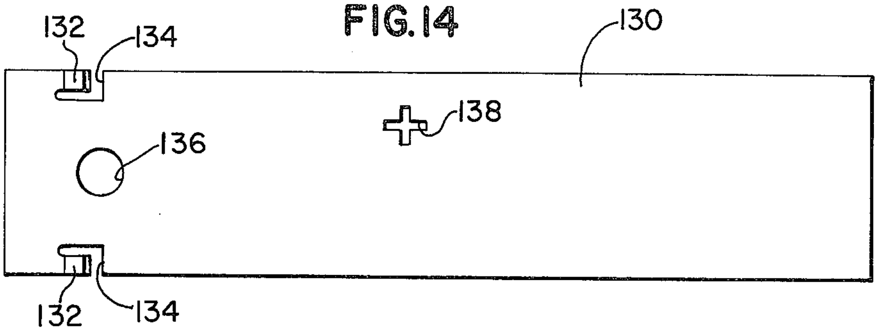
FIG. 14 is a plan view of the preferred embodiment of the clapper reed.

The elongated flat metallic generally rectangular reed 130 as seen in FIGS. 14 and 15, includes a pair of struck up fingers 132 extending along the longitudinal edges of reed 130 toward an orienting shoulder 134. The shoulders 134 lie in a plane falling on the center point of a central aperture 136. Midway along the extremity of reed 130 is a slot 138 which in the embodiment is cruciform in configuration. The reed 132 is first threaded under the bridge 112 and then the shoulders 134 are brought into engagement with the front face of posts 106 with the resilient fingers 132 acting against the opposite face of post 106. The tapered ends 107 of post 106 assist in the assembly operation. When the reed is bottomed in recess 104, it is accurately positioned relative to the reference post 106 as well as being provided with the predetermined angular disposition over the reed plate. In the present instance it was found that recess 104 should be angularly disposed approximately 4° relative to the upper surface of reed plate 90. A rivet 110 is then telescoped through the apertures 136 in the reed and 108 in the reed plate and suitably headed to securely restrain the reed. By disposing the shoulders 134 against the reference post 106, a positive assembly in a predetermined relation or normal state of rest is obtained so that the reed is not canted or angularly disposed relative to aperture 100 in the reed plate. The bridge 112 and its lower point 116 of undersurface 114 establishes the predetermined bias that is desired in the reed.

Figure 16:
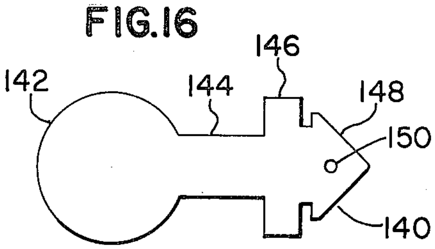
FIGS. 16 and 17 are plan views of two forms of control flaps.

In order to restrain the reed against inadvertent vibrations due to surges caused by clothing or towels which would stick to grill 26 and thereby give an inadvertent sound warning, the reed is supplied with a flexible rubber-like flap 140 of the general configuration shown in FIG. 16. The flap 140 includes a large round portion 142, a central flexible portion 144, laterally extending flanges 146 and an arrow-shaped head 148 having a centrally disposed aperture 150 therein. A suitable tool is placed through the cruciform slot 138, engages the aperture 150 and pulls the arrowhead 148 through the slot the flanges 146 are seated on the upper surface and the arrowhead underlies the reed. This assembly generally takes place before the reed is assembled with the reed plate.

Figure 26:
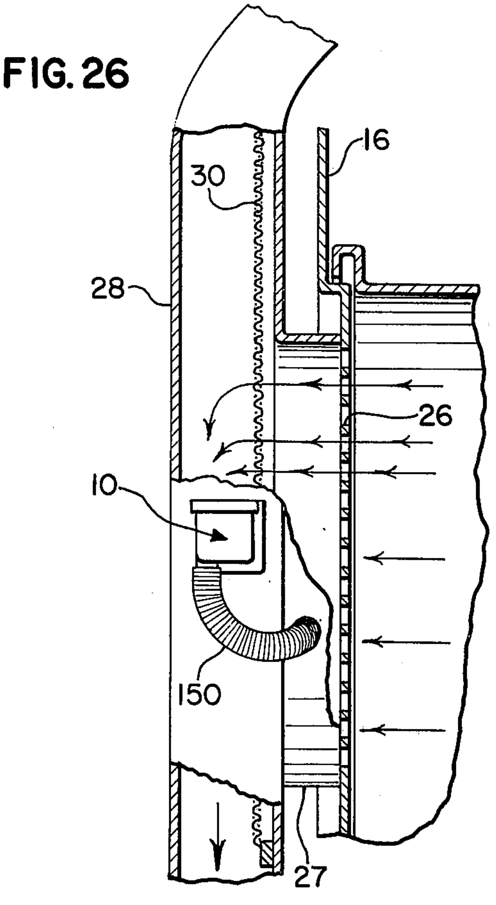
FIG. 26 is a partial sectional view of an installation of the device contemplated by the present invention to a clothes dryer as taken generally along Line 26—26 of FIG. 1 showing the flow of air through a filter that is clean.
Figure 27:
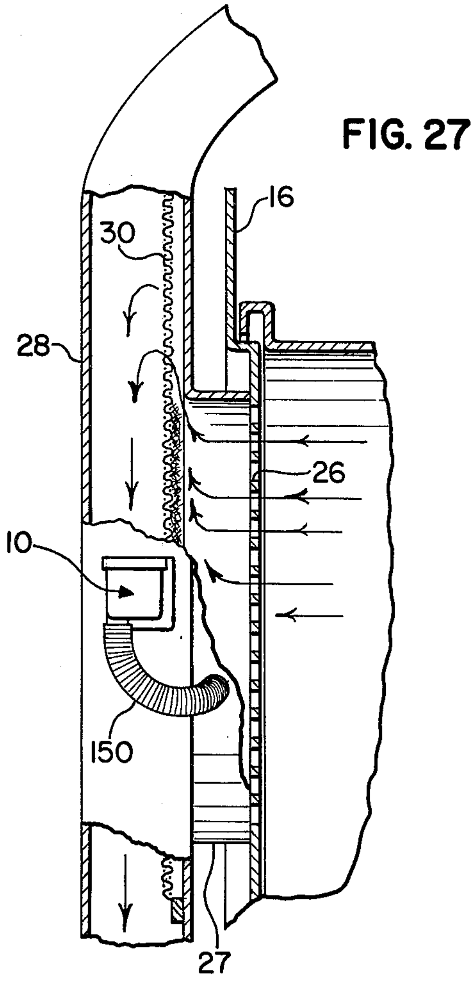
FIG. 27 is a similar cross-sectional view to that shown in FIG. 26 and showing the flow of air when the lint filter has collected lint and when the alarm would be activated.
Figure 7:
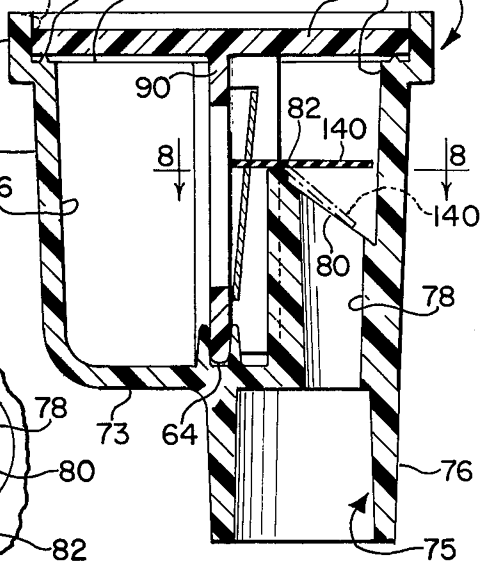
FIG. 7 is a cross-sectional view taken along Lines 7—7 of FIG. 3.
Figure 8:
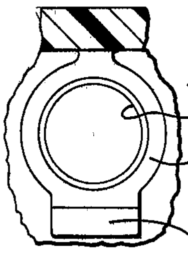
FIG. 8 is a partial sectional view taken along Line 8—8 of FIG. 7.
Figure 6:
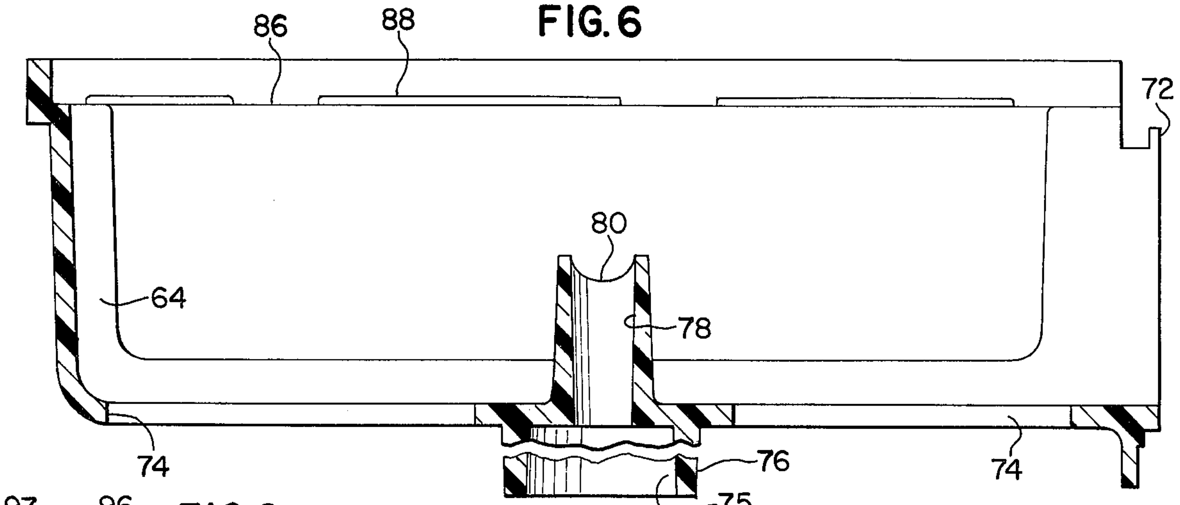
FIG. 6 is a partial sectional view taken along Lines 6—6 of FIG. 4.
Figure 9:
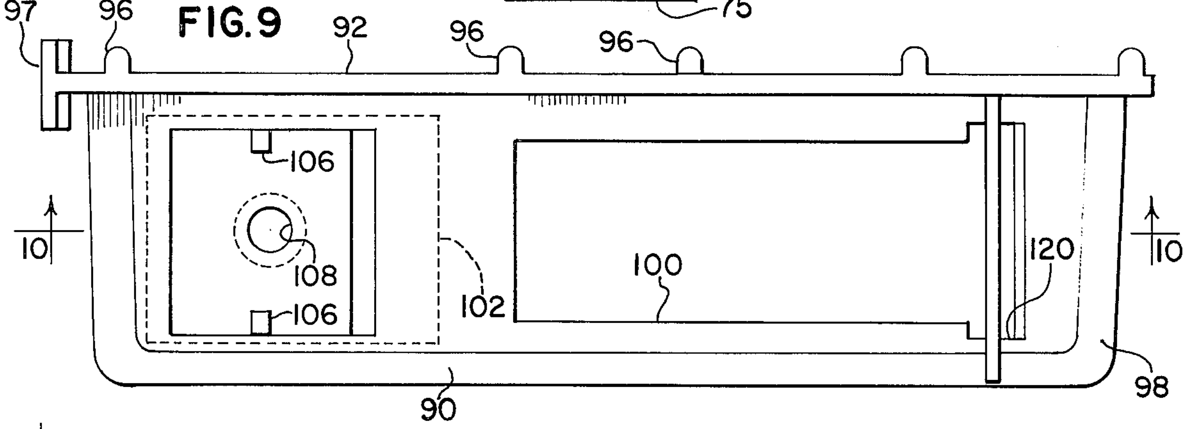
FIG. 9 is a plan view of the apertured reed plate and cover that is associated with the chamber case.
Figure 10:
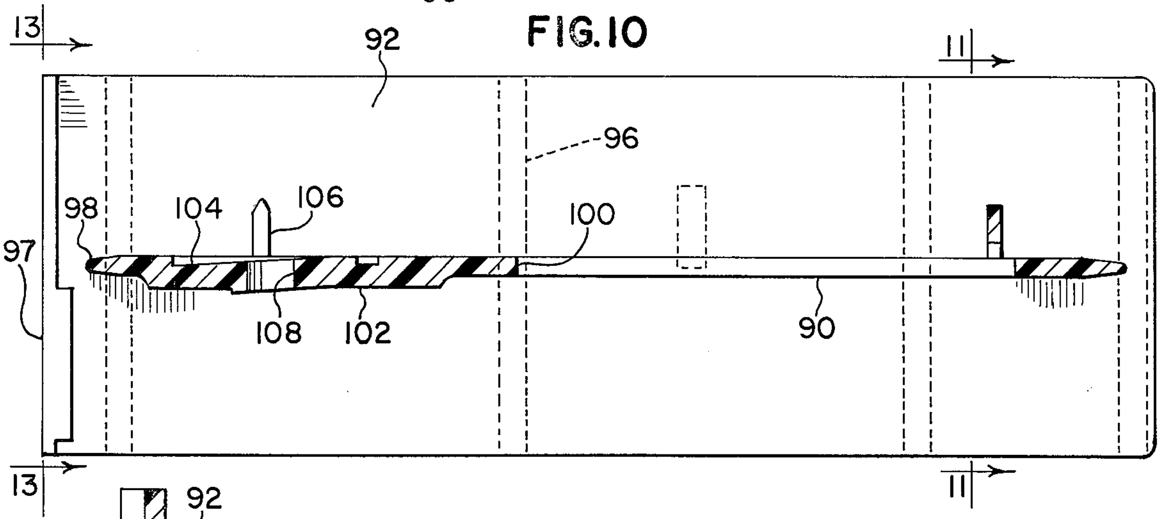
FIG. 10 is an elevational view in partial section taken along 10—10 of FIG. 9.
Figure 11:
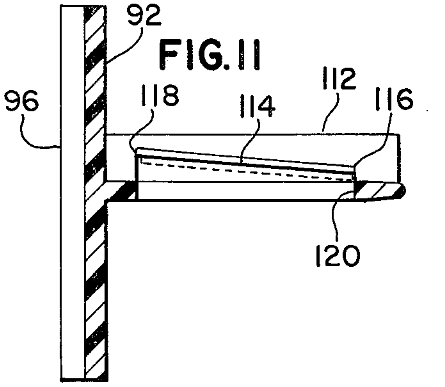
FIG. 11 is a partial cross-sectional view taken along Line 11—11 of FIG. 10.
Figure 12:
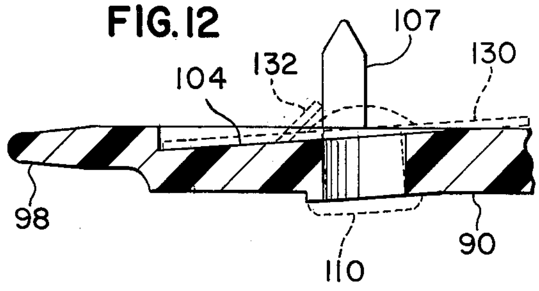
FIG. 12 is a partial cross-section of the angular cavity in the apertured reed plate for mounting the reed in which is shown in phantom.
Figure 13:
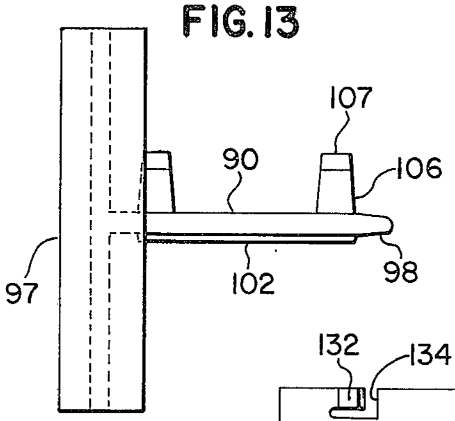
FIG. 13 is an end elevational view as viewed along Line 13—13 of FIG. 12.
Figure 17:
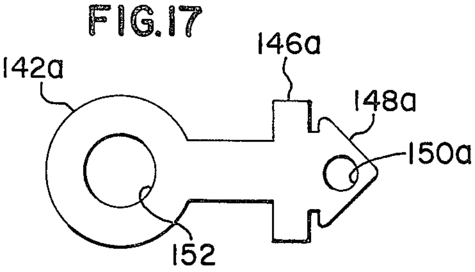

Referring now to FIGS. 7 and 26 and 27, the audible alarm 10 is mounted in the side wall of lint chute 28 and has constant communication therewith through port 70. Port 75 is connected to an opening in the side passage 27 on the opposite side of filter 30 by suitable tubing 150. As was previously explained, the passage of air through the grill 26, intermediate passage 27 and the lint chute 28, when the lint filter 30 is clean produces a Venturi effect across the opening in the passage 27 and thereby creates a partial vacuum or negative pressure in the vent passageway 78. This causes the flap 140 to bend over the surface 82 and be angularly disposed against surface 80, thereby at least partially sealing said vent port 78 as shown in phantom in FIG. 7. When the deposit of lint against filter 30 increases to a predetermined level, normally two-thirds of the filter surface, the fan 20 causes a partial vacuum on the under side of the reed in chamber 66 and due to the filter clogging the Venturi effect through vent 78 is minimized, thereby releasing its grip on flap 140, at a predetermined level, and permits the passage of ambient air through port 74 to cause the reed to commence vibrating. This warns the user to then clean the filter 30 and thereby save energy and operation of the device. The configuration and size of the upper portion 142 of flap 140 can be controlled to obtain the desired effect. For example, it will be noted that in FIG. 7 the flap 140 does not totally cover the vent port 78 on the angular surface 80. A modification to the flap 140 and designated with the suffix "*a* " can be seen in FIG. 17 wherein the round portion 142*a* includes a centrally disposed aperture 152. The size and disposition of the aperture 152 can be determined emperically for different applications.

Figure 19:
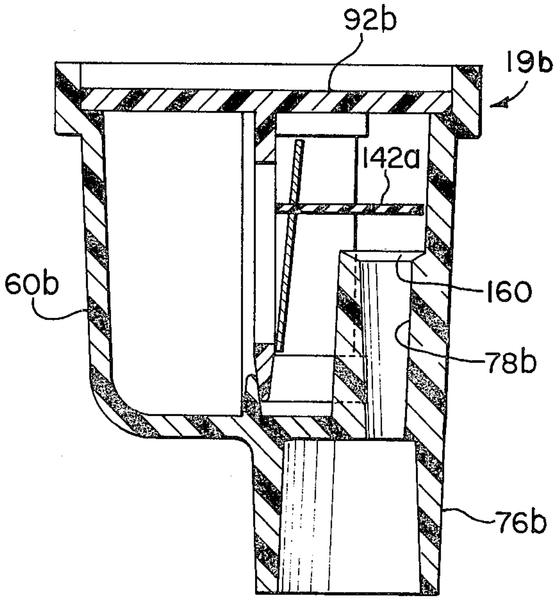
FIG. 19 is a partial sectional view taken along Line 19—19 of FIG. 18.

FIG. 19 is a second embodiment of the chamber case that differs from the first embodiment solely in that the vent port 78*b* terminates in a camfered cone-shaped opening 160. This device is particularly adaptable for use with a flap of the configuration shown in FIG. 17 with the forces required to unseat the flap being dependent upon the size of aperture 152, as opposed to the angular disposition against surface 82 as shown in the first embodiment.

Figure 20:
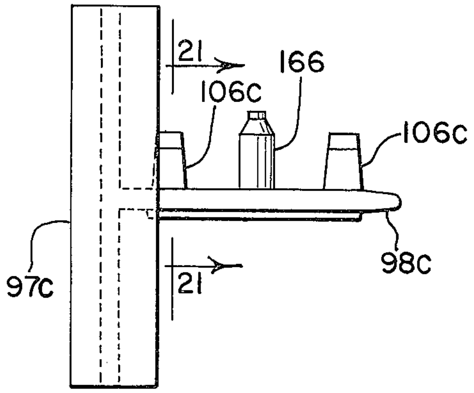
FIG. 20 is an end elevational view of modified form of reed plate and cover.
Figure 21:
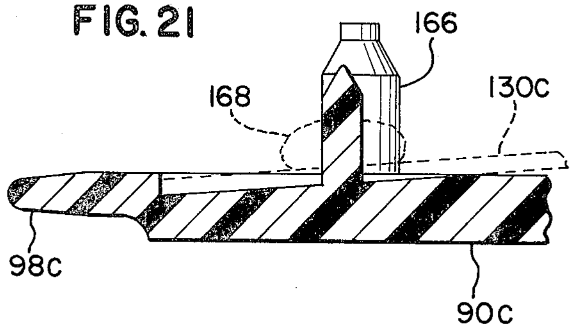
FIG. 21 is a partial sectional view taken along Line 21—21 of FIG. 20.
Figure 25:
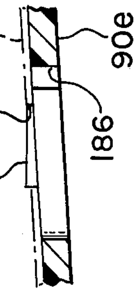
FIG. 25 is a partial sectional view as shown along Line 25—25 in FIG. 23.
Figure 24:
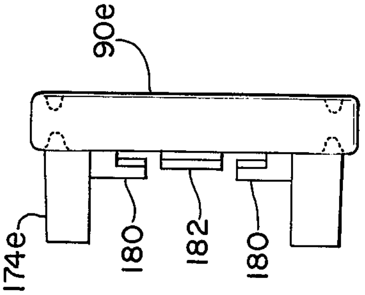

A modification to the mounting means on the read plate can be seen in FIGS. 20 and 21, wherein the suffix "*c*" is used with the appropriate numerals. In this device, rather than using a separate rivet 110, a central post 166 is used with reference posts 106*c*. This plastic central post 166 can be deformed to the shape shown in phantom and designated 168 to retain the reed 130*c*, as shown in phantom.

Figure 18:
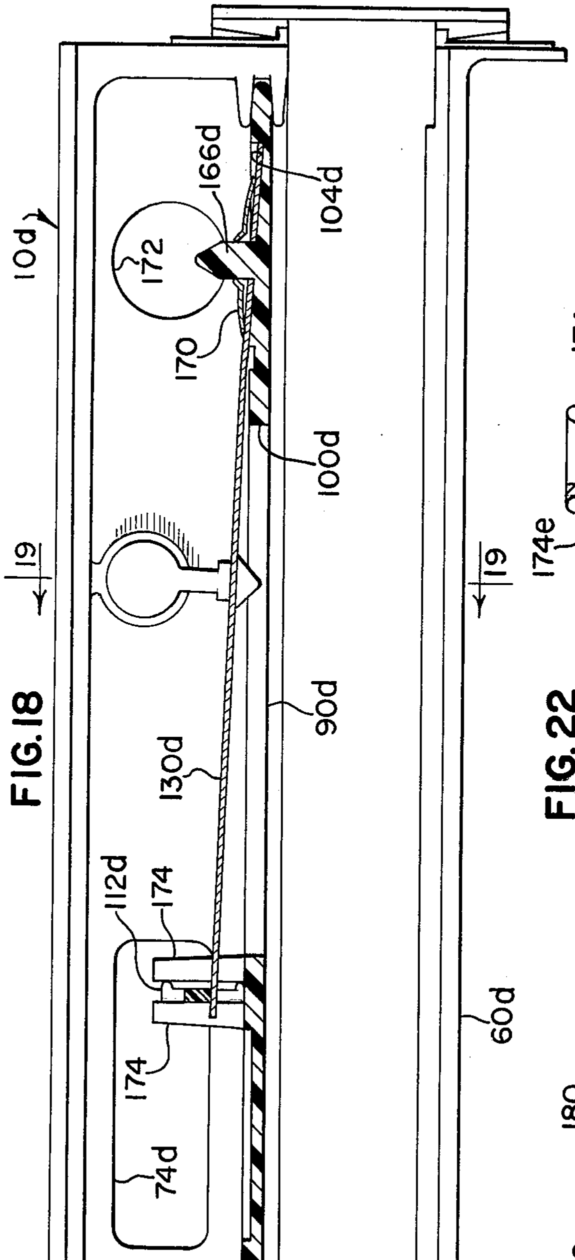
FIG. 18 is an elevational view in partial section of another embodiment of the present invention.
Figure 22:
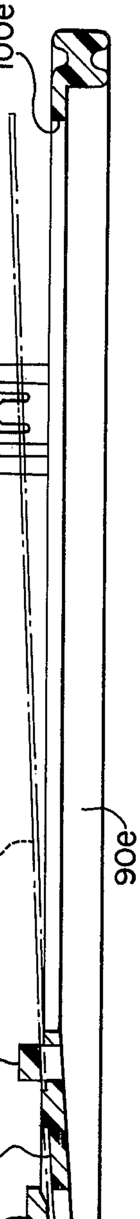
FIG. 22 is an elevational view in partial section of another embodiment of the apertured reed plate as viewed along Line 22—22 in FIG. 23.
Figure 23:
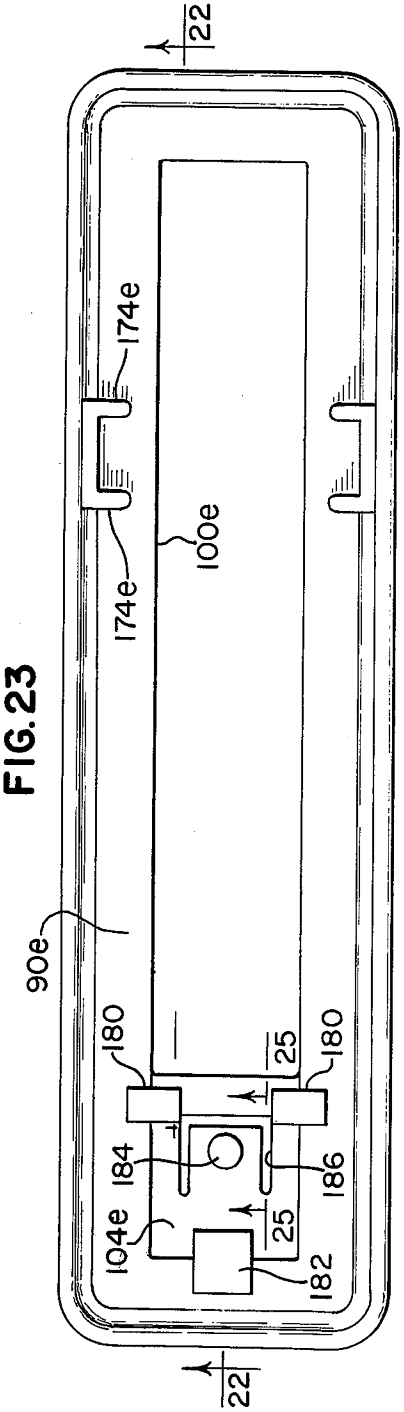
FIG. 23 is a plan view of the device shown in FIG. 22.

A further embodiment can be seen in FIG. 18, wherein similar parts are designated by similar numerals with the addition of the suffix "*d*." In this device the reed 130*d* is mounted over a central post 166*d* in recess 104*d* and maintained in position by a sheet metal spring grip 170 which grippingly engages post 166 and has suitable take-up means for engagement of the reed and maintaining it in its angular disposition. The other modification in this embodiment is the presence of a rectangular aperture or port 74*d* in the back wall of the case 60*d* at a position adjacent the nose of the reed while the secondary port 172 is circular in configuration. A further modification is that the bridge 112*d* is not integral with the reed plate 90*d*. The bridge 112*d* is an independent member either sheet metal or plastic which is captured within a pair of spaced posts 174 located on opposite sides of the aperture 100*d*. In this embodiment it is possible to adjust the bias point of the reed 130*d* by moving the bridge 112*d* within the slot created by post 174.

The last embodiment of this invention is shown in FIGS. 22 through 25 wherein similar parts are designated by similar numerals with the addition of the suffix "*e*." This embodiment relates primarily to the reed plate and the method of assembly of the reed with the plate. In this device the reed plate 90*e* includes the central aperture 100*e* and has spaced posts 174*e* forming a slot for accepting a bridge, not shown. At the opposite end, the reed is provided with a central aperture, of the type generally designated 136, but shown in phantom for purposes of illustration. The reed plate is provided with a pair of overhanging side elements 180 and an overhanging end element 182, all which orienting elements overhang or overlie the angularly disposed recess 104*e*. The central portion of recess 104*e* includes an upwardly extending locating 184 that has a tapered upper surface. The recess 104*e* is relieved by a U-shaped slot 186 that makes that portion of the reed plate 90*e*, surrounding the stud 184, resilient. A reed having a central aperture would be fed under the overhanging elements 180, depressing the stud 184 and its resilient environs downwardly until the stud is accepted within aperture 136*e* of the reed. The fixed extremity of the reed 130*e* then underlies the rear overhang 182 for a positive retention. Suitable bridge means, not shown, is disposed within the groove formed by the spaced posts 174*e*. The operation of this device as well as all of the other devices is substantially indentical. Other variations in mounting means both for the reed and the bridge will be apparent to those skilled in the art. By varying the position of the bias bridge, the size of the apertures or ports, and the size and position of the flap, other audible alarms that will respond to various conditions can be made to suit the particular configurations and parameters of pressure conditions found in other apparatus with which the warning device is to be utilized.

In the embodiments disclosed, the chamber case as well as the reed plate and cover subassembly are generally injected molded of thermo plastic materials suitable for the environment within which they are to be used. The reed is a sheet metal device which is preferably fabricated from tempered box spring steel with the differential flap being fabricated of a flexible material such as polyurethane having approximately a 90 durometer. The choice of other materials which are available now on in the future will be apparent to those skilled in the art, of course, such choice being dependent upon the environment within which the audible alarm is to be used.

I claim:

1. An audible vibratory reed assembly including a housing, a plate-like member having an aperture passing there-through forming a wall of at least one chamber in said housing, a flat reed having elongated side edges and fixed at one narrow end to said plate-like member, the plane of said reed at its fixed end forming an acute angle with the plane of said plate-like member and defining a normal state of rest, said reed adapted to cover a substantial portion of said aperture with its free extension when activated to vibrate by a pressure differential on opposite sides of said plate-like member and means spaced from said fixed one end and adapted to engage a point along one elongated edge of said reed for biasing said reed by angularly distorting said reed from its normal state of rest.

2. A device of the type claimed in claim 1 wherein said biasing means includes a bridging member supported in spaced relation above said plate-like member and extending transversely thereof, said bridging member provides a surface positioned above said reed and in opposition thereto, said surface being angularly disposed relative to the plane of said plate-like member and contacting one elongated edge of said reed at the low point of said surface and spaced from said reed at the high point of said surface when said reed is in its unactivated condition, said reed when activated bending adjacent its fixed end to strike said plate-like member and thence springing upwardly to first strike the low point of said bridge surface and then twisting along its length to strike the high point of said surface whereby the normal clatter of said reed is tripled.

3. A device of the type claimed in claim 2 wherein said plate-like member includes orienting means spaced from said aperture adapted to cooperate with the fixed end of said reed and locate the free extremity of said reed in a predetermined angular relationship to said apertured plate-like member.

4. A device of the type claimed in claim 3 wherein said means for orienting said reed include an angularly disposed portion of said plate-like reused in relation to the remainder of the adjacent surface of said plate-like member, at least one locating post extending upwardly from the angularly disposed surface of said plate-like member and means integral with said reed for locating said reed relative to said post and said angularly disposed surface.

5. A device of the type claimed in claim 4 wherein said plate-like member includes three upstanding post members positioned transversely in spaced relation to one another to establish the final positioning of said reed, said reed including notches adjacent its edges cooperating with two of said posts and a central aperture accepting the central third post there through, fastening means cooperating with said central post for retaining said reed in juxtaposition to said angularly disposed portion of said surface.

6. A device of the type claimed in claim 5 wherein said reed includes resilient finger means extending into said notches for engaging one side of each post and drawing the notch into firm engagement with the opposite side of said post for positively locating and positioning said reed relative thereto and as an incident thereof orienting said reed in a predetermined position relative to the aperture in said plate-like member.

7. A device of the type claimed in claim 2 wherein means are provided for exerting differential of pressure on opposite sides of said reed to cause said reed to vibrate when a predetermined plateau of pressure differential is reached consonant with the bias applied to said resilient reed.

8. A device of the type claimed in claim 7 wherein said means for providing a differential in pressure on opposite sides of said reed includes a chamber on each side of said reed substantially sealed from one another except for the aperture in said plate-like member.

9. A device of the type claimed in claim 2 wherein said briding member is an independent secondary element secured to said plate-like member.

10. A device of the type claimed in claim 2 wherein said bridge is integral with said plate-like member and extends between opposite sides of said aperture.

11. A differential pressure signal device including a housing, an apertured plate-like member dividing said housing into two chambers, apertured means in said housing for exposing one chamber to ambient pressure, means connecting the second chamber to a pressure source lower than said ambient pressure thereby creating a differential in pressure between said two chambers, a resilient elongated flat reed fixed at one end to said plate-like member and adapted to overlie the aperture therein, the plane of said reed at its fixed end forming an acute angle with the plane of said plate-like member and defining a normal state of rest, means positioned relative to said plate-like member and in engagement with one elongated side edge of said reed at a point spaced from the point said reed is fastened to said plate-like member, said latter means biasing said reed from its normal state of rest whereby said reed will vibrate only upon the application of a predetermined differential in pressure between said two chambers.

12. A device of the type claimed in claim 11 wherein said biasing means includes a bridging member extending transversely of said reed and substantially fixed relative to the surface of said plate-like member and engaging one edge of said reed adjacent the surface of said reed opposite the surface facing said apertured plate-like member.

13. A device of the type claimed in claim 12 wherein the undersurface of said bridging member is angularly disposed relative to said reed and said plate-like member whereby vibration of said reed causes the reed to first strike said plate-like member adjacent its aperture, then strike the biasing low point of said angularly disposed bridging member and thence to strike the high point of said angularly disposed bridging member whereby said reed will vibrate in a wave-like motion both transversely and longitudinally to provide an audible alarm.

14. A device of the type claimed in claim 3 wherein said bridging member is independent and fixed relative to said plate-like member and reed.

15. A device of the type claimed in claim 13 wherein said bridging member is integral with said plate-like member.

16. A device of the type claimed in claim 13 wherein said one chamber of said housing communicating with said ambient pressure includes a differential port and a source of negative pressure connected to said port and means connected to said reed and controlled by said differential port for controlling activation of said reed.

17. A device of the type claimed in claim 16 wherein said means includes a flexible strap-like member fixed to said reed and serving as a valve sucked into said differential pressure port to prevent movement of said reed unless the differential of pressure between the two chambers in the housing exceeds the negative pressure level of said differential port source.

18. A device of the type claimed in claim 17 wherein said one chamber of said housing is connected to the outlet duct side of a lint filter and said differential port source is connected to the inlet side of said filter.

19. A lint filter signal device for audibly reporting the build-up of line in a filtering device by reflecting the differential of pressure across said filtering device, including a housing member divided into two chambers by a plate-like apertured means, said apertured means supporting a resilient vibratory elongated flat reed fixed at one end and capable of covering a substantial portion of said aperture in said plate-like means with its free end when activated to vibrate by a pressure differential between said chambers, the plane of said reed at its fixed end forming an acute angle with the plane of said plate-like member and defining a normal state of rest, means for communicating one chamber of said housing member with the outlet of said lint filter and means for communicating the second chamber with ambient pressure, means positioned relative to said plate-like means for engaging one elongated edge of said flat reed at a point spaced from its fixed end to thereby angularly bias said reed from its normal state of rest to permit its activation only upon application of a predetermined differential in pressure between said two chambers.

20. A device of the type claimed in claim 19 wherein said biasing means includes a bridging member extending transversely in opposite to said reed and said apertured dividing means with the undersurface of said bridging member being angularly disposed to provide a biasing low point for contacting the reed and a high point normally spaced from the reed.

21. A device of the type claimed in claim 20 wherein means are provided for connecting a port in the second chamber of said housing to the inlet side of said filter and means fixed to said reed controlled by said port whereby activation of said reed will be controlled by the differential pressure experienced by the two sides of said filter.

22. A device of the type claimed in claim 21 wherein said means fixed to said reed includes a flexible plate-like member fastened to said reed and capable of sealing off said port when the pressures within said port are lower than said ambient pressure, said flexible member restraining said reed against vibration until such time as the differential of pressure between the first and second chambers exceeds the differential of pressure between said port pressure and ambient pressure.

* * * * *